(12) United States Patent
Tsai et al.

(10) Patent No.: US 8,290,065 B2
(45) Date of Patent: Oct. 16, 2012

(54) IMAGE PROCESSING SYSTEM

(75) Inventors: Jui-Yuan Tsai, Tai Nan (TW);
Chao-Hsin Lu, Ta Yuan Hsiang (TW)

(73) Assignee: Realtek Semiconductor Corp., Hsinchu (TW)

( * ) Notice: Subject to any disclaimer, the term of this patent is extended or adjusted under 35 U.S.C. 154(b) by 1451 days.

(21) Appl. No.: 11/878,564

(22) Filed: Jul. 25, 2007

(65) Prior Publication Data

US 2008/0030584 A1    Feb. 7, 2008

(30) Foreign Application Priority Data

Aug. 4, 2006   (TW) .............................. 95128585 A

(51) Int. Cl.
*H04N 7/12*   (2006.01)

(52) U.S. Cl. ......... 375/240.28; 375/240.26; 375/240.01; 375/240.25; 348/423.1; 348/388.1

(58) Field of Classification Search ............. 375/240.28, 375/240.26, 240.1, 240.25; 348/423.1, 388.1
See application file for complete search history.

(56) References Cited

U.S. PATENT DOCUMENTS

| | | | |
|---|---|---|---|
| 5,920,626 A | 7/1999 | Durden et al. | |
| 6,285,717 B1 * | 9/2001 | Bahng et al. | 375/240.29 |
| 2002/0036579 A1 * | 3/2002 | Grosso et al. | 341/144 |
| 2004/0183769 A1 | 9/2004 | Schreyer et al. | |
| 2008/0007656 A1 | 1/2008 | Tsai et al. | |
| 2008/0030620 A1 | 2/2008 | Tsai et al. | |
| 2008/0032658 A1 | 2/2008 | Tsai et al. | |

* cited by examiner

*Primary Examiner* — Edan Orgad
*Assistant Examiner* — Roderick Tolentino
(74) *Attorney, Agent, or Firm* — Muncy, Geissler, Olds & Lowe, PLLC

(57) ABSTRACT

The invention discloses an image processing system comprising a video source system, a transmission medium, and a television system. The image processing systems of the video source system and the television system are equipped with an additional digital-to-analog converter and an additional analog-to-digital converter.

10 Claims, 6 Drawing Sheets

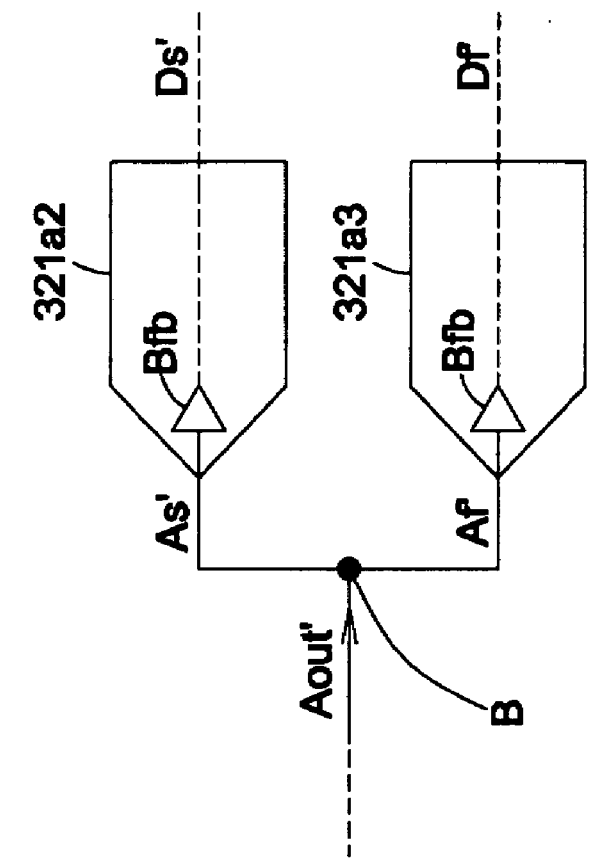
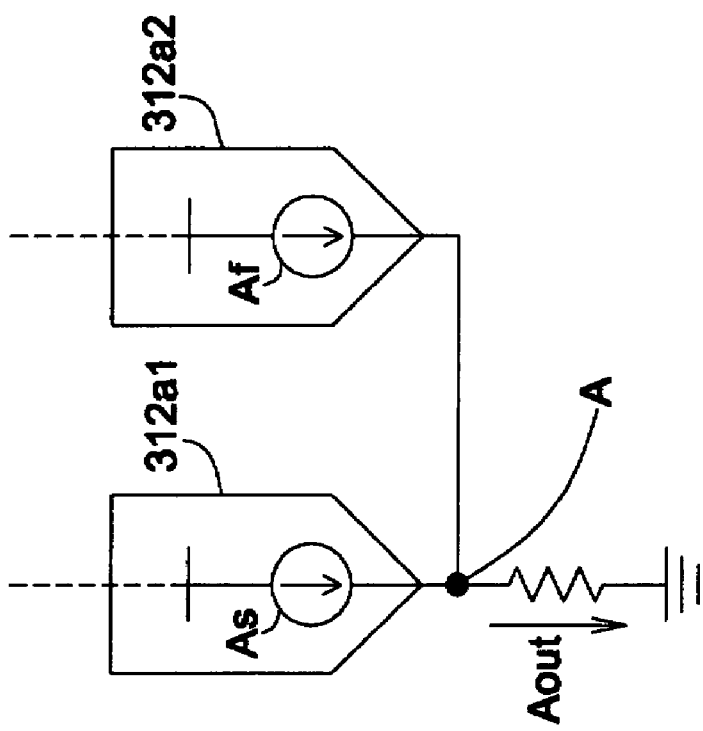
FIG. 4B
FIG. 4A

IMAGE PROCESSING SYSTEM

BACKGROUND OF THE INVENTION (a) Field of the Invention

The invention relates to image processing system, particularly to video source system and television system.

(b) Description of the Related Art

Since the entering of the 20th century, the development of television technology and its applications has proven that it is now part of human life and core of entertainment. Because of the improvement of display technology in recent years, providing massive data and high-definition images has become the focus of the future development of the television industry. Please refer to FIG. 1, showing a schematic diagram of a typical television system and its video source. As shown in FIG. 1, the video source system 110 transmits video data in analog signal format to a television system 120 for broadcasting video pictures. Although a digitized transmission interface has already become available, an analog transmission interface is still most commonly used.

The video source of the television system 120 can take many forms, such as a DVD player, set top box, and even various game consoles. In general, the components of the video source system 110 comprise a video encoder 112 for performing image data encoding, and a digital-to-analog converter (DAC) 114, which converts the encoded digital signal into an image analog signal and outputs the image analog signal.

The television system 120, such as a LCD TV or other flat panel television system or digital television system, which is becoming the main stream applications, receives an image analog signal transmitted from the video source, converts it into digital format with an analog-to-digital converter (ADC) 124, and performs decoding operation with a video decoder 122 for further image processing and broadcasting.

There are many types of video encoding format. The most commonly available ones are: CVBS signal format, luminance chrominance (YC) signal format, and color difference (YPrPb) signal format and so forth. Therefore, the analog transmission interface for transmitting video signals between the video source system 110 and the television system 120 can also be one of several types, such as AV interface for transmitting signals in the CVBS format; S-video interface for transmitting signals in the YC format; and color difference video interface for transmitting signals in the YPrPb format. Among the above-mentioned various signal formats, the CVBS signal, the Y signal of the S-video, and the Y signal of the color difference video, all comprise not only the components corresponding to image data but also the synchronizing signal component for performing synchronization operation.

FIG. 2 shows a schematic diagram illustrating an analog video signal comprising both the image data and the synchronizing signal. As shown in FIG. 2, in the case of the CVBS signal format, the video signal comprises the image signal CVBS and the synchronizing signal (Sync signal) S. The typical signal level range of the image signal CVBS covers 0~0.7V while that of the synchronizing signal S covers −0.3V~0V. The image signal CVBS comprises the image data that will be actually displayed to the users, while the synchronizing signal S comprises the prerequisite information for performing synchronizing operation. Although the synchronizing signal S is not displayed, it is still transmitted to the later stage receiving circuit as the reference basis for synchronization operation. Therefore, the dynamic ranges of the digital-to-analog converter 114 and the analog-to-digital converter 124 have to cover both the ranges of the image signal CVBS and of the synchronizing signal S, which result in a total dynamic range of 1V.

In general, for the television system, certain requirements on the resolution of the image signal component contained in the analog video signals transmitted are necessary to assure the picture quality while broadcasting. Thus, the digital-to-analog converter 114 and the analog-to-digital converter 124 both have to support up to certain number of significant bits. However, due to factors_such as capacitance and impedance matching during semiconductor manufacturing process, the more the number of significant bits of the digital-to-analog converter 114 and the analog-to-digital converter 124 is, the more the manufacturing cost and the design complexity becomes. This situation becomes more aggrieved when considering the fact that the synchronizing signal occupies part of the dynamic range, because in order to achieve the same resolution, it requires even more significant bits to cover a larger dynamic range.

BRIEF SUMMARY OF THE INVENTION

In light of the above-mentioned problem, one object of the invention is to provide an image processing system, which can raise the image resolution with lower cost and lesser design complexity, provided that the digital-to-analog converter and the analog-to-digital converter have a limited number of significant bits.

In order to achieve the above-mentioned object, the invention provides an image processing system, comprising a video source system, a transmission medium, and a television system.

The video source system receives an image digital signal and generates at least one image analog signal. The video source system comprises a video encoder and an analog back-end device. The video encoder receives the image digital signal, encodes the image digital signal, and generates at least one digital synchronizing signal comprising synchronizing operation information and at least one encoded digital signal comprising the image information. The analog back-end device comprises a first digital-to-analog converter and a second digital-to-analog converter. The first digital-to-analog converter receives a digital synchronizing signal and converts the received digital synchronizing signal into an analog synchronizing signal. Meanwhile, the second digital-to-analog converter receives an encoded digital signal and converts the encoded digital signal into an output analog signal. The above-mentioned analog back-end device combines the analog synchronizing signal and the output analog signal at an output node to generate an image analog signal.

The transmission medium is used to transmit the above-mentioned image analog signal.

The television system receives at least one image analog signals to generate one digital output signal. The television system comprises an analog front-end device and a video decoder. The analog front-end device comprises a first clamper, a first analog-to-digital converter, and a second analog-to-digital converter. The first clamper receives an image analog signal and performs DC voltage level calibration of the received image analog signal. The first analog-to-digital converter extracts an analog synchronizing signal from the calibrated image analog signal and converts the analog synchronizing signal into a digital synchronizing signal. The second analog-to-digital converter extracts an output analog signal from the calibrated image analog signal and converts the output analog signal into a to-be-decoded digital signal. The video decoder receives the digital synchronizing signal and the to-be-decoded digital signal to perform the synchronizing operation based on the received digital synchronizing signal and decodes the to-be-decoded digital signal to generate a digital output signal.

The image processing system according to the invention uses two digital-to-analog converters or analog-to-digital converters with small number of significant bits to share the work load of the traditional single digital-to-analog converter or analog-to-digital converter that has large number of significant bits. Moreover, according to the various requirements on the resolution for the synchronizing signal and the image signal, the different significant bits of the two digital-to-analog converters or two analog-to-digital converters are allocated to resolve the synchronizing signal and the image signal separately. Therefore, not only the cost and design complexity are reduced but also the image resolution is increased.

BRIEF DESCRIPTION OF THE DRAWINGS

FIG. 4A shows a schematic diagram illustrating a current mode digital-to-analog converter according to one embodiment of the invention.

FIG. 4B shows a schematic diagram illustrating a voltage mode analog-to-digital converter according to one embodiment of the invention.

DETAILED DESCRIPTION OF THE INVENTION

Figure 3:
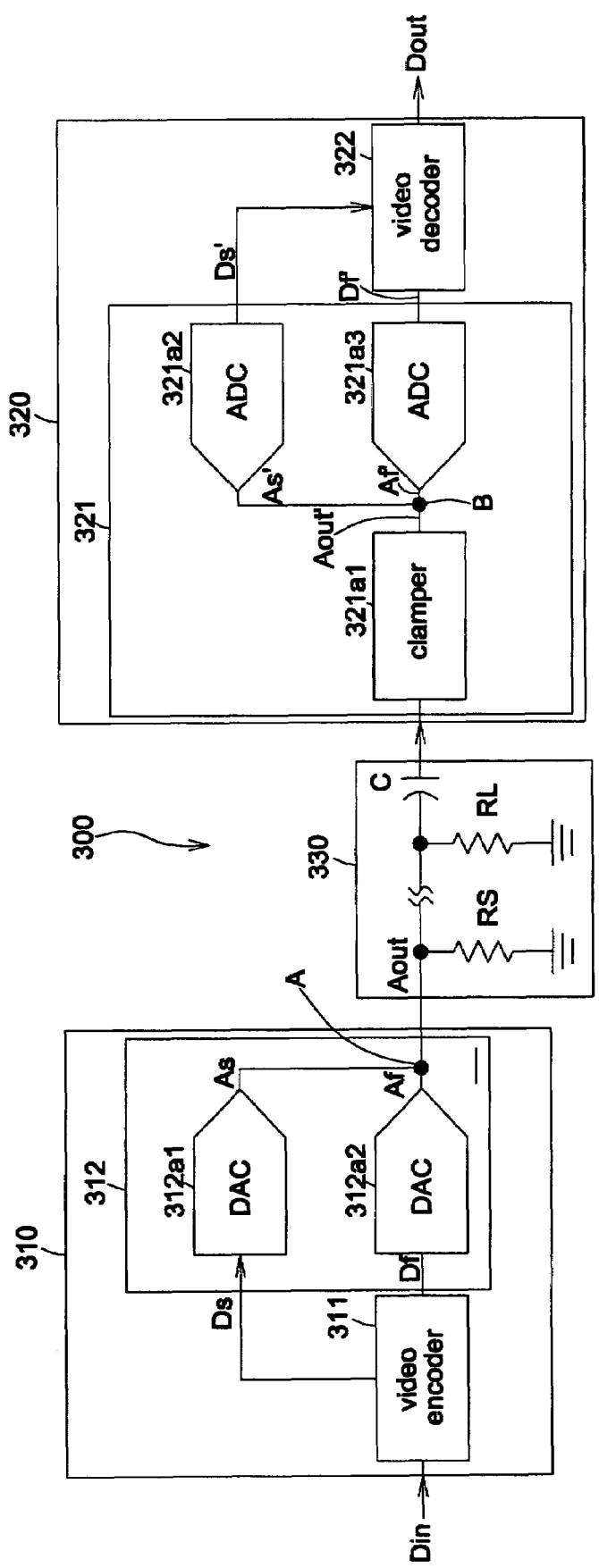
FIG. 3 shows a schematic diagram illustrating the image processing system according to one embodiment of the invention.

FIG. 3 shows an image processing system according to one embodiment of the invention. The image processing system 300 comprises a video source system 310, a television system 320, and a transmission medium 330. In one embodiment of the invention, the video signal format, transmitted to the television system 320 via the transmission medium 330 from the video source system 310, comprises both the image data component and the synchronizing signal component, such as the CVBS signal, the YC signal, or the YPrPb signal. However, the applications of the invention are not limited by these examples. Any existing or future to be developed video format can also apply the concept of the invention. Although the above-mentioned embodiment uses a television system as one example of an image broadcasting device, the invention is not limited thereto. For the purpose of illustration, an example using the CVBS signal is given in the following.

In this embodiment, a resistor symbol RS, a resistor symbol RL, and a capacitor symbol C together represent the equivalent impedance effect of the transmission medium 330. For those who are familiar with the image processing technology, the transmission medium in practice can be realized in various well-known or innovative ways. Here the transmission medium 330 is embodied with a cable (i.e., wired), which conforms to the above-mentioned signal format.

In this embodiment of the invention, the video source system 310 receives an image digital signal Din and generates an image analog signal Aout. The video source system 310 comprises a video encoder 311 and an analog back-end device 312. The video encoder 311 receives the image digital signal Din, encodes the image digital signal Din, and generates an encoded digital signal Df comprising the image information. The video encoder 311 also generates a digital synchronizing signal Ds comprising synchronizing operation information. The analog back-end device 312 further comprises a first digital-to-analog converter 312a1 and a second digital-to-analog converter 312a2. The first digital-to-analog converter 312a1 receives the digital synchronizing signal Ds and converts the digital synchronizing signal Ds into an analog synchronizing signal As. Meanwhile, the second digital-to-analog converter 312a2 receives the encoded digital signal Df and converts the encoded digital signal Df into an output analog signal Af. Then, the analog synchronizing signal As and the output analog signal Af are combined together at an output node A to generate an image analog signal Aout comprising a synchronizing signal and an image display signal. Subsequently, the image analog signal Aout is transmitted via the transmission medium 330.

The television system 320 receives the image analog signal Aout and generates a digital output signal Dout. The television system 320 comprises an analog front-end device 321 and a video decoder 322. The analog front-end device 321 further comprises a clamper 321a1, a first analog-to-digital converter 321a2, and a second analog-to-digital converter 321a3. The clamper 321a1 receives the image analog signal Aout and performs DC voltage level calibration of the image analog signal Aout. The first analog-to-digital converter 321a2 extracts an analog synchronizing signal As' at an input node B from the calibrated image analog signal Aout' and converts the analog synchronizing signal As' into a digital synchronizing signal Ds'. The second analog-to-digital converter 321a3 extracts an output analog signal Af' at an input node B from the calibrated image analog signal Aout' and then converts the output analog signal Af' into a to-be-decoded digital signal Df'. Afterwards, the video decoder 322 receives and decodes the digital signal Df' to generate the digital output signal Dout. As for the digital synchronizing signal Ds', it is used as the basis of the synchronizing operation.

Figure 1:
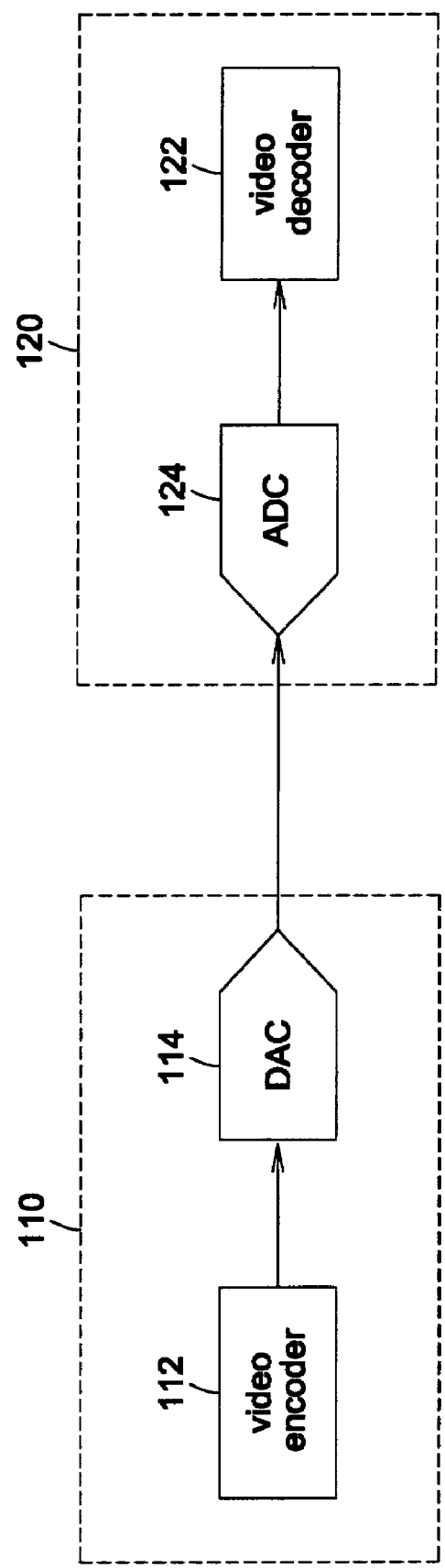
FIG. 1 shows a schematic diagram illustrating a television system and a video source thereof.
Figure 2:
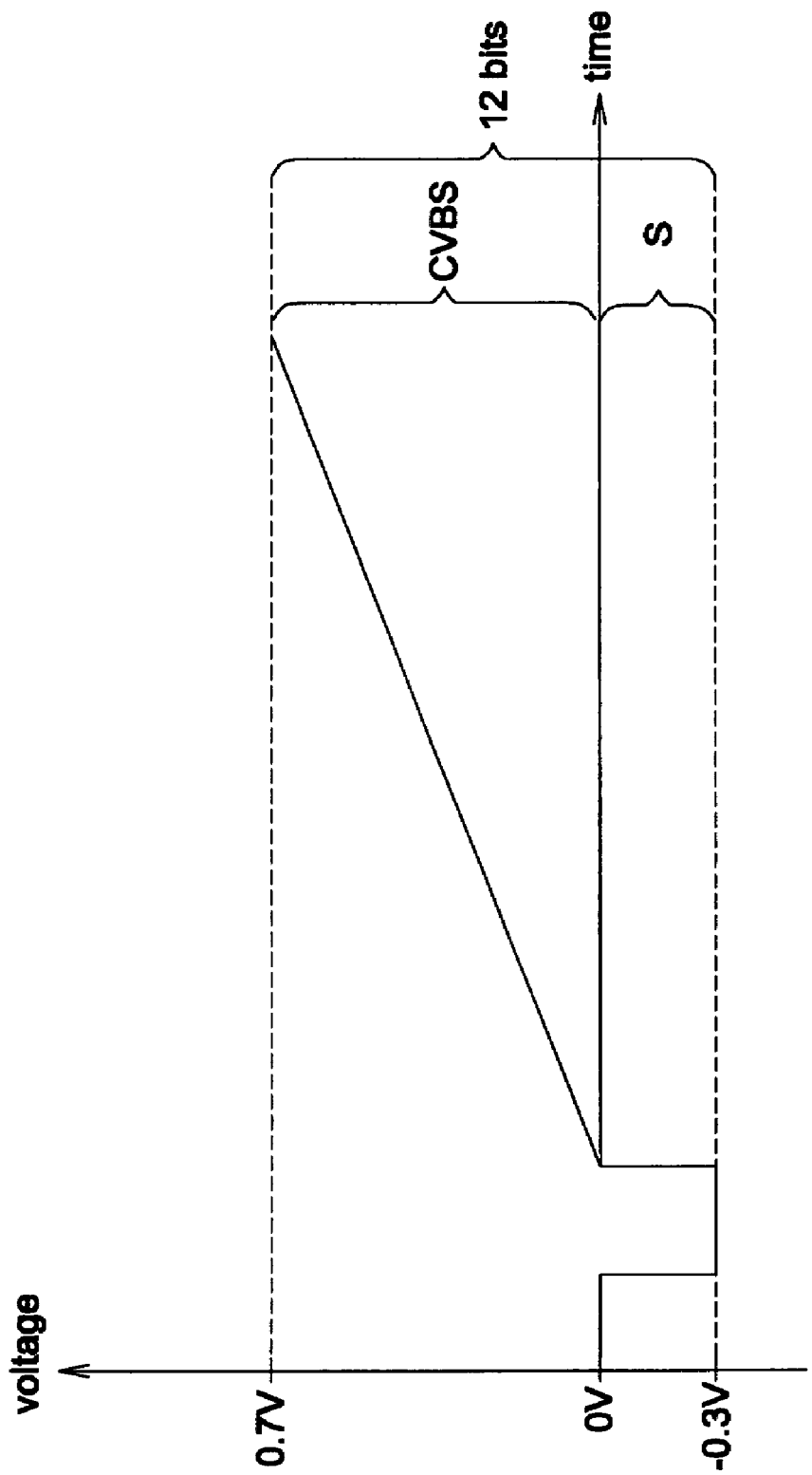
FIG. 2 shows a video signal waveform diagram comprising an image data component and a synchronizing signal component.

As shown in FIG. 2, the dynamic ranges of the digital-to-analog conversion and analog-to-digital conversion in a traditional television system and video sources thereof, cover two parts, the CVBS signal (0.7V) and the synchronizing signal S (0.3V); that is, a total dynamic range of 1V is needed. However, generally the synchronizing signal S requires only a small number of significant bits for acceptable resolution, such as 1-2 bits. Thus, using a single digital-to-analog conversion or analog-to-digital conversion mechanism with a large number of significant bits (e.g., 12 bits) to resolve the 1V dynamic range, which covers both the synchronizing signal S and the CVBS format image display signal, is proven to be uneconomic. Large number of significant bits causes increase in the cost, chip size, and power consumption.

Therefore, the above-mentioned embodiment of the invention discloses the image processing system 300, using the two digital-to-analog converters 312a1, 312a2 with a lesser number of significant bits, and the two analog-to-digital converters 321a2, 321a3 with a lesser number of significant bits, to replace a single digital-to-analog converter and a single analog-to-digital converter with a larger number of significant bits, respectively. Moreover, depending on various resolution requirements of the signal components under processing; for example, the synchronizing signal S (−0.3~0V) may only need limited resolution, while the CVBS signal (0~0.7V) usually requires much higher resolution, the number of significant bits of the two digital-to-analog converters 312a1, 312a2, or the analog-to-digital converters 321a2, 321a3 can be accordingly allocated.

In this embodiment of the invention, in the video source system 310 the digital synchronizing signal Ds and the encoded digital signal Df are fed into the first digital-to-analog converter 312a1 and the second digital-to-analog converter 312a2, respectively. The first digital-to-analog converter 312a1 performs the conversion to the digital synchronizing signal Ds with 2-bit resolution, while the second digital-to-analog converter 312a2 performs the conversion to the encoded digital signal Df with 10-bit resolution. Finally, by using current mode digital-to-analog conversion structures as exemplified in FIG. 4A, the analog synchronizing signal As (−0.3~0V) and the output analog signal Af (0~0.7V) respectively generated by the two converters 312a1 and 312a2 merge together at an output node A by way of current addition, to generate the image analog signal Aout, which comprises both the CVBS display image component and the synchronizing signal component. Of course, the current mode digital-to-analog converter shown in FIG. 4A serves only as an example, and other structures are also feasible.

In the television system 320, after the DC voltage level of the image analog signal Aout is calibrated by the clamper 321a1, the image analog signal Aout' comprising both the analog synchronizing signal As' (−0.3~0V) and the output analog signal Af' (0~0.7V) is fed into the first and the second analog-to-digital converters 321a2, 321a3 at the input node B. FIG. 4B shows a voltage mode analog-to-digital converter structure. Because the input terminals of both the two converters 321a2 and 321a3 are set with buffers Bfb, the converters 321a2 and 321a3 can be designed at different signal extracting voltage levels, and thus the analog synchronizing signal As' and the output analog signal Af' at different voltage levels can be respectively fed into the first, the second analog-to-digital converters 321a2 and 321a3. The first analog-to-digital converter 321a2 performs the conversion on the analog synchronizing signal As' with 2-bit resolution and generates the digital synchronizing signal Ds', while the second digital-to-analog converter 321a3 performs the conversion on the output analog signal Af' with 10-bit resolution and generates a to-be-decoded digital signal Df'. Obviously, the voltage mode analog-to-digital converter shown in FIG. 4B serves only one as an example and other structures are also possible.

Figure 5:
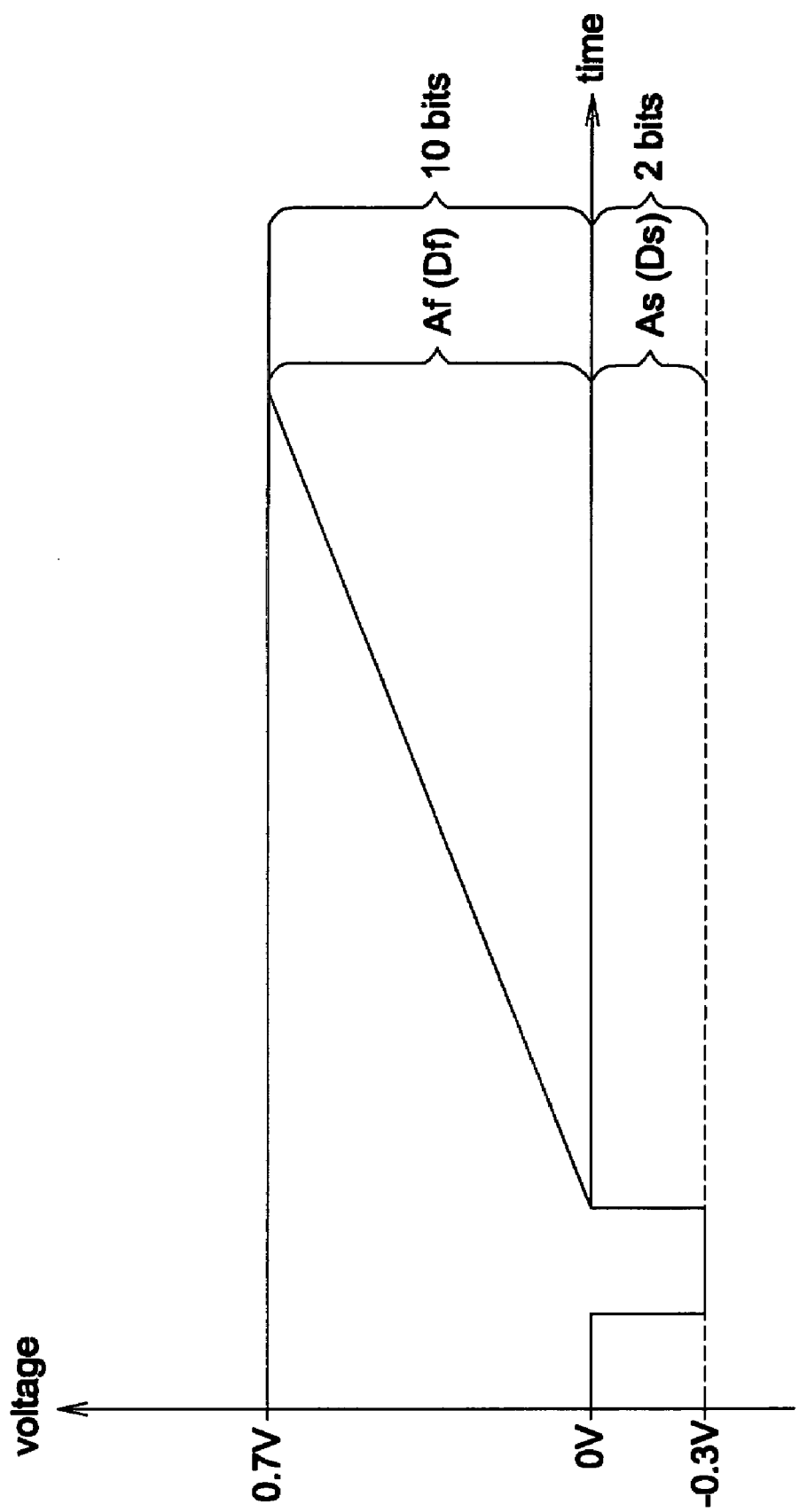
FIG. 5 shows a video signal waveform diagram comprising an image data component and a synchronizing signal component according to one embodiment of the invention.

FIG. 5 shows a schematic diagram illustrating the dynamic range allocation of digital-to-analog conversion or analog-to-digital conversion and the deployment of the number of significant bits, according to the structure as in the above-described embodiment. As shown in FIG. 5, according to the structure of the above-mentioned embodiment of the invention, while performing the digital-to-analog coversion or the analog-to-digital coversion for the synchronizing signal component with its dynamic range spreading between −0.3~0V, a 2-bit (or even 1-bit) converter is acceptable, since the resolution requirement for the synchronizing operation is less restricted. On the contrary, while performing the digital-to-analog or analog-to-digital conversion for the image display signal component with its dynamic range spreading between 0~0.7V, a 10-bit converter is sufficient to achieve the same desired resolution since the dynamic range is less than that in the prior art (1V). Therefore, by adopting a 10-bit converter and a 2-bit converter in this embodiment of the invention, it can easily achieve the resolution that will need a single 12-bit converter in the prior art. While the number of significant bits increases, the design complexity and the manufacturing cost of the digital-to-analog converter and analog-to-digital converter drastically increases. Thus, the design of the invention can greatly reduce the circuit cost.

It should be noted that the image analog signal Aout generated by the video source system 310 is in the image display signal of the CVBS format and the image analog signal Aout received by the television system 320 is also in the image display signal of the CVBS format, because the structure of the image processing system 300 is one of the CVBS encoding format. Furthermore, because the CVBS signal format, the Y signal of S-video, and the Y signal of the color difference video can be similarly processed, the video source system 310 or the television system 320 can also be used in the processing of the Y signal of the S-video and of the Y signal of the color difference video. Of course, if the image processing system 300 needs to simultaneously process the Y and the C signals of the S-video, an additional set of digital-to-analog and analog-to-digital conversion circuits have to be introduced to the image data source system 310 and the television system 320 for processing the chrominance C signal. Similarly, if the Y, Pr, and Pb signals of the color difference video are to be processed simultaneously, it is required to have two additional sets of the digital-to-analog and analog-to-digital conversion circuits for processing the Pr, Pb signals of the color difference video.

Figure 6:
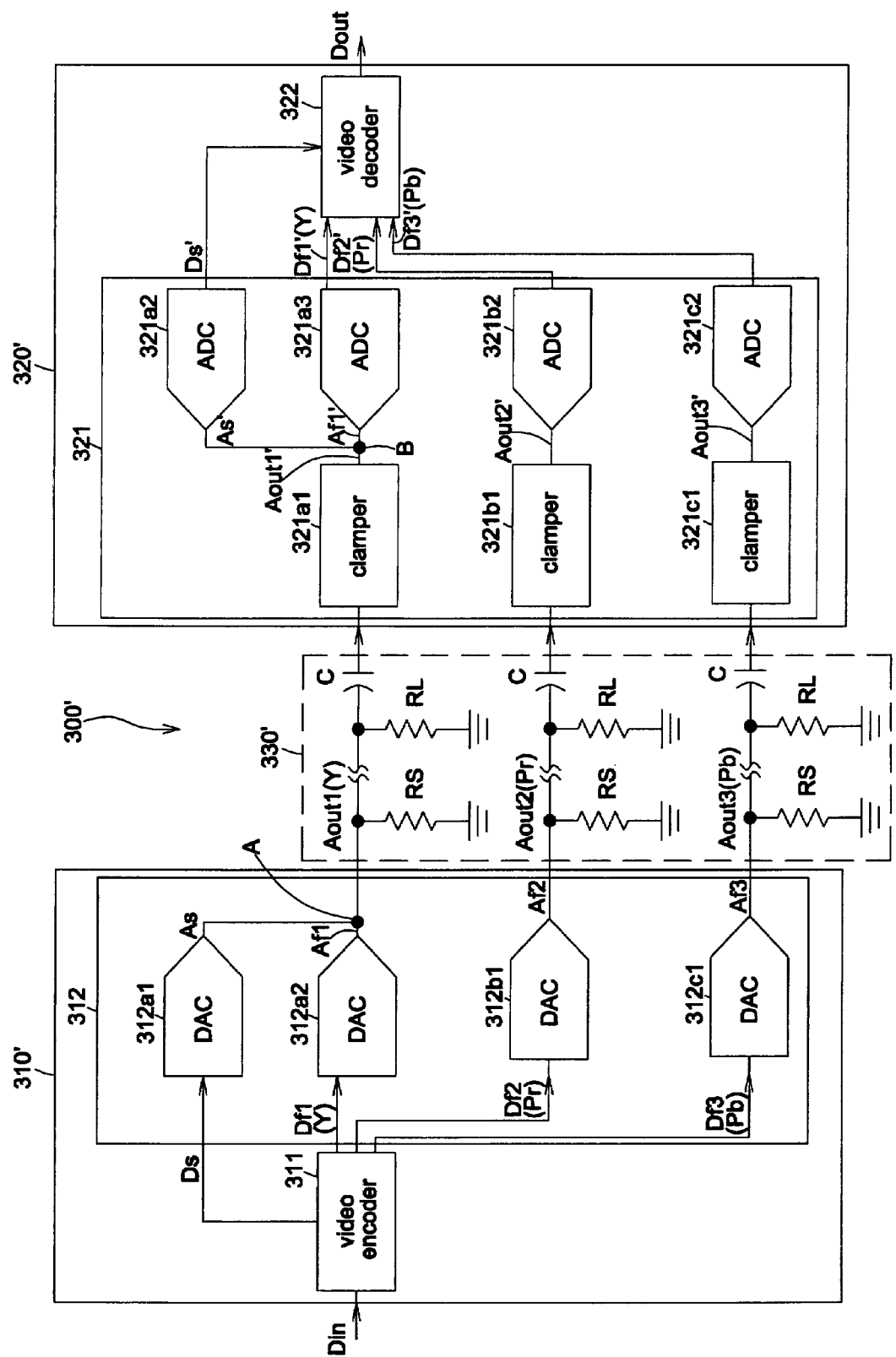
FIG. 6 shows a schematic diagram illustrating the image processing system according to another embodiment of the invention.

For example in FIG. 6, an image processing system 300' for processing the Y, Pr, Pb signals of the color difference video is shown. As shown in FIG. 6, the image processing system 300' uses three sets of conversion circuits for respectively processing the three Y, Pr, and Pb signals. The structure and operation of the image processing system 300' are similar to those of the image processing system 300 shown in FIG. 3. The differences are that two digital-to-analog converters 312b1, 312c1 are added in the video source system 310' and two sets of transmission routes (eg. two cables; the resistor symbols RS, RL, and capacitor symbol C representing the equivalent impedance effect of these two cables) are added in the transmission medium 330', and the circuits composed by the two sets of the clampers 321b1 and 321c1 and the analog-to-digital converters 321b2 and 321c2 are added in the television system 320'. The digital-to-analog converters 312b1 (or 312c1) in the video source system 310' receives the encoded digital signal Df2 (Pr signal) (or Df3 (Pb signal)) generated by the video encoder 311, converts the encoded digital signal Df2 (or Df3) into an output analog signal Af2 (or Af3), and then generates the image analog signal Aout2 (or Aout3) from the output analog signal Af2 (or Af3). The clamper 321b1 (or 321c1) receives an image analog signal Aout2 (Pr signal) (or Aout3 (Pb signal)) and performs calibration of DC voltage level of the image analog signal Aout2 (or Aout3). The analog-to-digital converter 321b2 (or 321c2) receives the calibrated image analog signal Aout2' (or Aout3') and converts the image analog signal Aout2' (or Aout3') into another to-be-decoded digital signal Df2' (or Df3'). Finally, the video decoder 332 integrates and decodes the received digital synchronizing signal Ds' and the three to-be-decoded digital signals Df1', Df2', and Df3, to thereby generate a digital output signal Dout and output to a display system for displaying the image.

Although the present invention has been fully described by way of examples with reference to the accompanying drawings, it should not be construed as any limitation on the scope of the present invention. Various modifications and changes can be made by those who are skilled in the art without deviating from the essence of the invention.

What is claimed is:

1. An analog back-end device for receiving at least one digital synchronizing signal and at least one encoded digital signal to generate at least one image analog signal, the analog back-end device comprising:
   a first digital-to-analog converter for receiving one of the digital synchronizing signals and converting the received digital synchronizing signal into an analog synchronizing signal wherein a number of significant bits of the first digital-to-analog converter is allocated according to a requirement on a resolution for the digital synchronizing signal; and
   a second digital-to-analog converter for receiving one of the encoded digital signals and converting the received encoded digital signal into an output analog signal wherein the number of significant bits of a second digital-to-analog converter is allocated according to the requirement on the resolution for the encoded digital signal;
   wherein the analog back-end device combines the analog synchronizing signal and the output analog signal at an output node to generate one of tile image analog signals;
   wherein the number of significant bits of the first digital-to-analog converter is less than that of the second digital-to-analog converter;
   wherein the at least one image analog signal is selected from the group consisting of the following: a Color, Video, Blanking, and Sync (CVBS) signal, a brightness Y signal of a S-video signal and a Y signal of a color difference video signal.

2. The analog back-end device according to claim 1, wherein the at least one image analog signal generated by the analog back-end device comprises a synchronizing signal component and an image display signal component.

3. The analog back-end device according to claim 1, further comprising: at least one third digital-to-analog converter for receiving one of the encoded digital signals and generating one of the image analog signals.

4. The analog back-end device according to claim 3, wherein the image analog signal generated by the third digital-to-analog converter is selected from the group consisting of the following: a chrominance C signal of the S-video signal, a Pr signal of the color difference video signal, and a Pb signal of the color difference video signal.

5. The analog back-end device according to claim 3, wherein the image analog signal generated by the third digital-to-analog converter does not comprise a synchronizing signal component.

6. The analog back-end device according to claim 1, wherein the digital synchronizing signal and the encoded digital signal are generated by a video encoder.

7. A video source system for receiving an image digital signal and generating at least one image analog signal, the video source system comprising:
   a video encoder for receiving and encoding the image digital signal to generate at least one digital synchronizing signal and at least one encoded digital signal;
   a first digital-to-analog converter for receiving one of the digital synchronizing signal and converting the digital synchronizing signal into an analog synchronizing signal wherein the number of significant bits of the first digital-to-analog converter is allocated according to the requirement on the resolution for the digital synchronizing signal; and
   a second digital-to-analog converter for receiving one of the encoded digital signal and converting the encoded digital signal into an output analog signal wherein the number of significant bits of the second digital-to-analog converter is allocated according to the requirement on the resolution for the encoded digital signal;
   wherein the video source system combines the analog synchronizing signal and the output analog signal at an output node to generate the image analog signal;
   wherein the number of significant bits of the first digital-to-analog converter is less than that of the second digital-to-analog converter;
   further comprising: at least one third digital-to-analog converter for receiving one of the encoded digital signals and generating one of the image analog signals;
   wherein the image analog signal generated by the third digital-to-analog converter does not comprise a synchronizing signal component.

8. The video source system according to claim 7, wherein the at least one image analog signal is selected from the group consisting of the following: a CVBS signal, a brightness Y signal of a S-video signal, and a Y signal of a color difference video signal.

9. The video source system according to claim 7, wherein the at least one image analog signal generated by the analog back-end device comprises a synchronizing signal component and an image display signal component.

10. The video source system according to claim 7, wherein the image analog signal generated by the third digital-to-analog converter is selected from the group consisting of the following: a chrominance C signal of the S-video signal, a Pr signal of the color difference video signal, and a Pb signal of the color difference video signal.

* * * * *